United States Patent [19]

Umberson

[11] Patent Number: 4,937,957
[45] Date of Patent: Jul. 3, 1990

[54] TORSIONAL LIMITING DEVICE FOR A VEHICULAR DITCHING APPARATUS

[75] Inventor: Gerald E. Umberson, Midland, Tex.

[73] Assignee: Capitol Trencher Corporation, San Dimas, Calif.

[21] Appl. No.: 127,447

[22] Filed: Dec. 2, 1987

[51] Int. Cl.$^5$ .............................................. E02F 3/24
[52] U.S. Cl. .................. 37/97; 37/DIG. 17; 192/113 B; 464/45
[58] Field of Search ............ 37/97, DIG. 17; 464/45, 464/46; 192/85 AA, 113 B, 20.29, 20.12

[56] References Cited

U.S. PATENT DOCUMENTS

| | | | |
|---|---|---|---|
| 2,642,971 | 6/1953 | Hagenbook | 464/45 X |
| 3,064,455 | 11/1962 | Gros | 464/46 X |
| 3,488,980 | 1/1970 | Burrough | 464/46 X |
| 3,756,325 | 9/1973 | Rucinski | 464/45 X |
| 4,004,641 | 1/1977 | Hendrickson | 464/45 X |
| 4,624,650 | 11/1986 | Hiruma et al. | 464/46 X |
| 4,728,053 | 1/1988 | Hitomi | 464/45 X |

*Primary Examiner*—Clifford D. Crowder
*Attorney, Agent, or Firm*—Lyon & Lyon

[57] ABSTRACT

A vehicular ditching apparatus in which an oil-cooled mechanism having rotating friction discs and plates, and further having a fluid controlled piston for increasing the friction between the discs and plates, is incorporated into the ditcher, aft of the transmission, as a torsional limiting device to protect the components of the drive chain in the event the cutting wheel of the ditcher is subjected to unexpected increased load, such as when it hits an unseen obstruction.

4 Claims, 3 Drawing Sheets

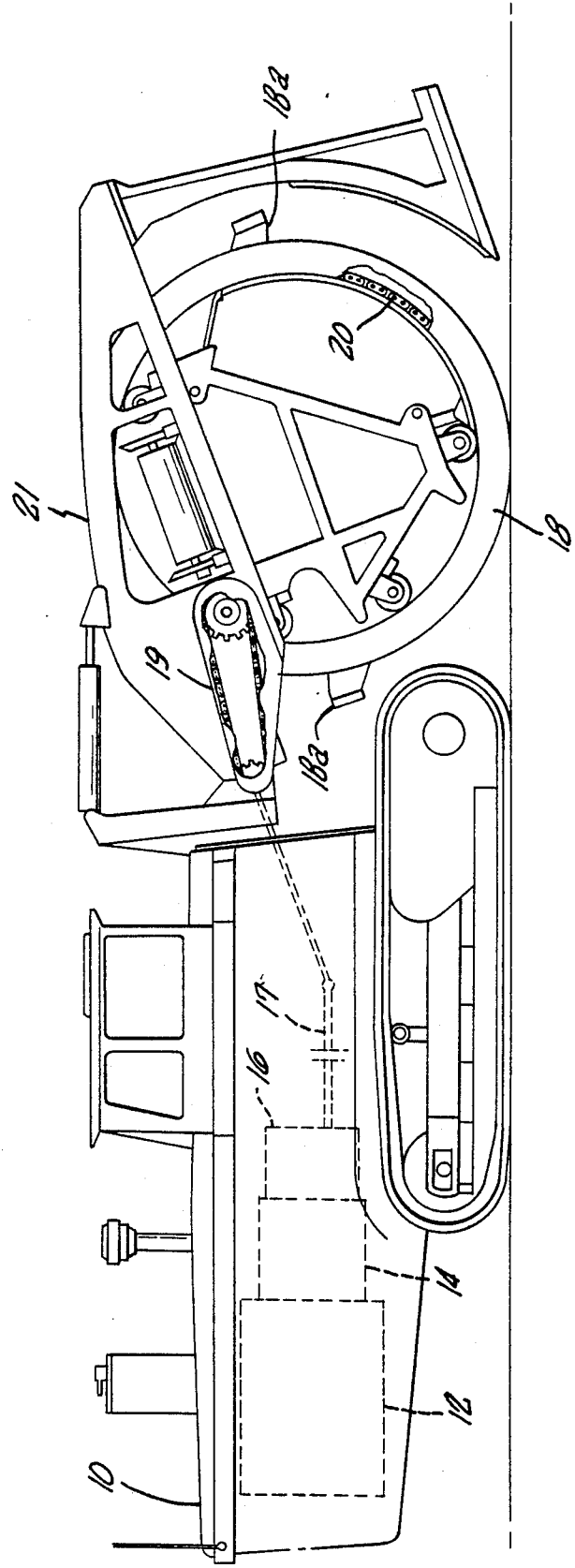

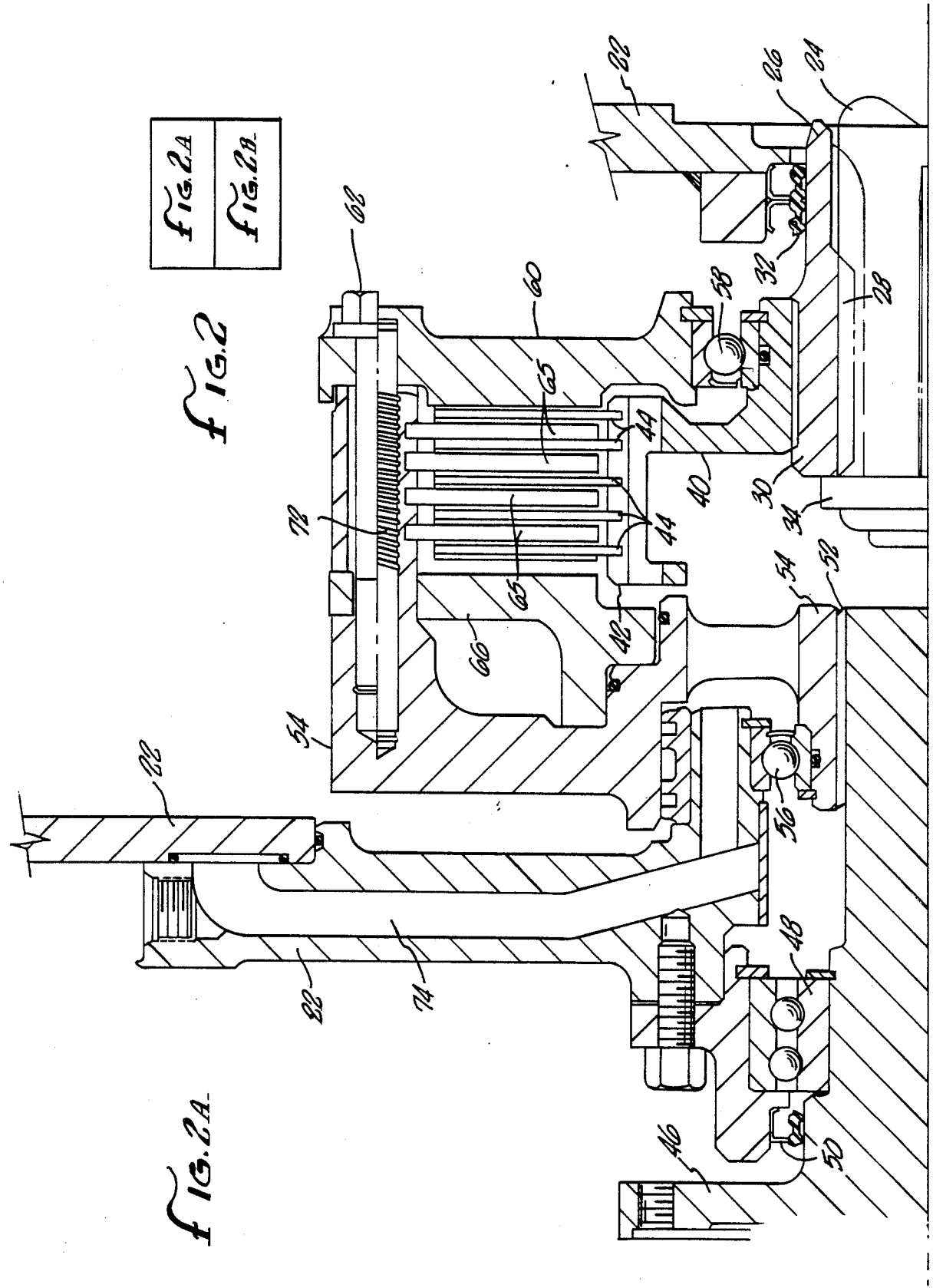

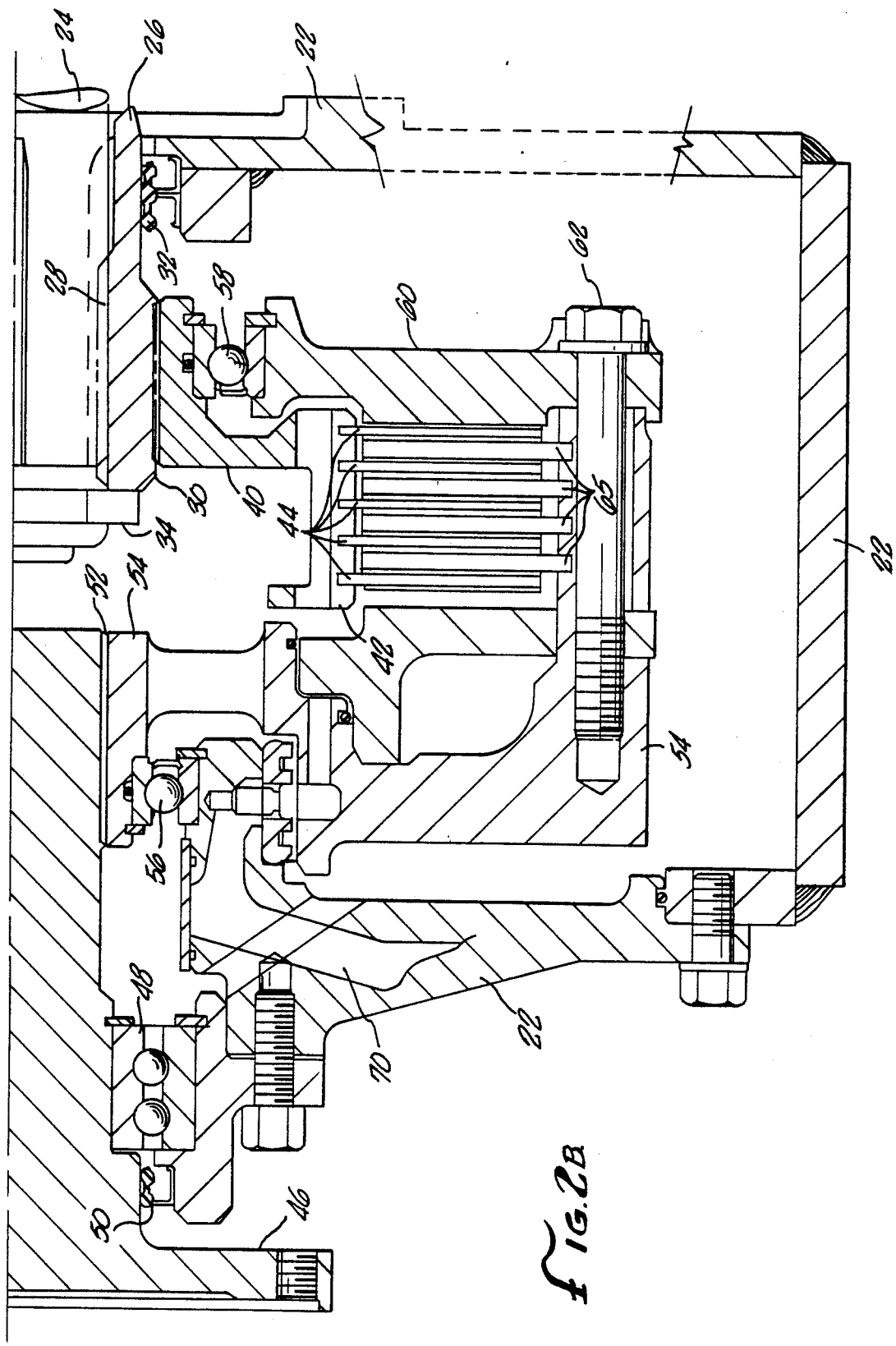

TORSIONAL LIMITING DEVICE FOR A VEHICULAR DITCHING APPARATUS

BACKGROUND OF THE INVENTION

1. Field of the Invention

This invention pertains to apparatus in the ditch digging field, and more particularly, to the large, self-powered ditchers having an engine which supplies power not only to the cutting wheel but also to the wheels or tracks of the ditcher. In this type ditcher, the engine cannot stop without severe damage to downstream components when the cutting wheel is suddenly stopped, thereby creating the need for some means to protect the engine and linkage when the cutting wheel is unexpectedly subjected to a significantly increased load, or stopped altogether.

2. Prior Art

The large, vehicular ditchers with which this invention is used are typically characterized by a tractor-like main frame to which a boom assembly and cutting wheel are attached. The engine in the ditcher produces the power not only to move the ditcher forward, but also to rotate the cutting wheel. These devices can be immense, with cutting wheels reaching 10 ft. in diameter. In operation, the cutting wheel is rotated and lowered into the ground, excavating dirt until the wheel has cut to the desired depth of the ditch. Then the ditcher is placed in forward motion and the ditch is extended.

In operation, it is not unusual for the cutting wheel to encounter an unforeseen obstruction which it cannot dig through at the forward speed at which the ditcher is travelling at the moment of encounter. When this happens, the cutting wheel may be stopped instantaneously. At that instant, the large engine in the ditcher which is providing the power to the cutting wheel is engaged. Accordingly, to avoid tearing the equipment apart, these ditchers necessarily employ some means for allowing slippage between the engine and the cutting wheel. Several alternative means have been employed. For example, a belt drive connection has been tried, although these are not suitable with the large ditchers because adequate tensioning cannot be obtained, such that too much slippage occurs.

Another device previously utilized in large ditchers for this purpose has been an over-centered clutch assembly. In this device, two or more dry clutch plates act upon one another frictionally to transfer power from the engine to the cutting wheel. The clutch plates are brought together by means of an overcentered toggle arrangement which includes a fine thread adjusting collar for increasing or decreasing the amount of friction between the plates. In operation, because of the coefficient of friction between the two plates, rotation of one plate is transferred to the other plate such that power from the engine is communicated to the cutting wheel. Then, should the cutting wheel strike an unforeseen obstruction or become subject to an excessive load, the torque thereby created overcomes the coefficient of friction between the two plates such that they begin to move relative to one another.

Although this device does work, it is subject to two substantial drawbacks. First, the coefficient of friction between the clutch plates is higher in the dynamic state than in the static state. Accordingly, as the plates first begin to move relative to one another, the coefficient of friction between them increases, actually working against a desired goal of of the device, which is to slip once the torque load exceeds a damageproducing level. The second major drawback is that these clutch plates, when they move relative to one another, generate a tremendous amount of heat very quickly. That heat causes the plates to expand, thereby increasing the coefficient of friction, compounding the situation and working against the desired goal. The heat build-up in this instance is such that the adjustable collar must be reset to compensate, then reset again when the plates have cooled.

Accordingly, there existed a need in the art for an improved means for limiting the torque which could be applied by the engine to downstream components.

SUMMARY OF THE INVENTION

To overcome those drawbacks, a multi-disc, oil-actuated and-controlled mechanism having friction discs and reaction plates is used as a torsional limiting device. Such a device has never before been used in this type ditcher. Moreover, the device of this invention is unlike conventional clutch mechanisms in that the discs and plates are designed such that once slippage occurs, the disc and plates more readily slip against one another, so as to further protect the ditcher components from damage. Additionally, since the plates are acted on and adjusted by a hydraulic piston any thermal expansion or wear is compensated for by the lineal movement of the piston.

It is, therefore, the object of this invention to provide an improved torsional limiting device for a vehicular ditcher.

DESCRIPTION OF THE FIGURES

FIG. 1 is a schematic showing the placement of the torsional limiting device within the cutting wheel power train of the ditcher.

FIG. 2 is a cross-section of the torsional limiting device of this invention. FIG. 2 has been bifurcated along the center line of the device, with FIG. 2a being the top half, FIG. 2b being the bottom half.

DETAILED DESCRIPTION OF THE PREFERRED EMBODIMENT

Looking at FIG. 1, the major components of the power train of a typical vehicular ditcher are shown schematically. The vehicle frame 10 of the ditcher houses the engine 12 to which a transmission 14 is attached. The torsional limiting device 16 of this invention is attached to the transmission at one end, and at the other end it is attached to the shaft 17 which in turn is geared to cutting wheel 18 having buckets 18a. Thus, power from the engine is communicated to the cutting wheel 18, via gears 19 and 20 causing it to rotate, on boom 21 which is attached to frame 10, and adjustable up and down relative thereto, such that the cutting wheel 18 can be lowered into or out of the ground.

The torsional limiting device 16 is shown in detail in cross section in FIGS. 2a and 2b, which depict the entire device in cross-section, bifurcated along its centerpoint, with the top half being shown in FIG. 2a, and the bottom half being shown in FIG. 2b. The device 16 has a housing 22 which is designed for attachment to a standard transmission, such that the power takeoff shaft 24 of the transmission is accepted within a sleeve 26 having interior splines 28 and exterior splines 30. The interior splines 28 mate with exterior splining on the power takeoff shaft 24, such that the sleeve 26 is rotated with the power takeoff shaft 24. A circular seal 32 prevents oil leakage around the sleeve 26. A nut 34 holds the sleeve 26 in position on the power takeoff shaft 24.

A rotating hub 40 mates with the exterior splines 30 so that it will rotate along with sleeve 26 and the power takeoff shaft 24. The hub 40 is provided with a number of exteriorly facing keys 42. Keyed thereto are five discs 44. Accordingly, as the power takeoff shaft 24 from the transmission 14 is rotated, the discs 44 are also caused to rotate. The discs 44 are capable of limited lateral movement on the keys 42.

Extending from the backside of the device 16 is driveshaft 46. It is driveshaft 46 which is attachable to the linkage 17 which extends and is geared to the cutting wheel 18. The driveshaft 46 is journalled in an aperture in housing 22 on bearings 48. A circular seal 50 prevents oil loss. The interior portion of driveshaft 46 has splines 52 which mate with the splines on the rotating housing assembly 54. The housing assembly 54 is journalled to the housing 22 by means of bearing 56 and bearing 58, which also journals the hub 40. This arrangement of bearings 48, 56 and 58 maintains coaxial alignment between the power takeoff shaft 24 and power output shaft 46, which in turn ensures coaxial and concentric rotation of hub 40 and housing assembly 54.

The housing assembly 54 includes an end plate 60 which is held to the main body of the housing assembly 54 by means of bolts 62. Slidably keyed to the housing assembly 54 are a series of reaction plates 65, which are sandwiched one each between two discs 44. The housing assembly 54 also houses a piston 66 which is fluid activated. Fluid is introduced to the piston by means of channel 68 in the housing assembly 54 and channel 70 in the housing 22. The piston 66 is used to bring pressure against the disc and plate assembly, pressing those against the interior face of the end plate 60, so as to increase the friction between the plates and discs. Fluid pressure is brought to bear on piston 66 by conventional means (not shown), and is likewise controlled by the operator of the ditcher by a control 79 in the operator's compartment (FIG. 1), also by conventional means (not shown). The piston 66 is biased away from the assembly of discs and plates by means of spring 72.

The assembly of disc 44 and plates 65 are oil cooled. Oil from an oil source 75 is introduced into the interior chamber of the device 16 by means of channel 74 in the outer housing 22. Oil is allowed to circulate between the disc 44 and plates 65, by means of grooves 81 (not shown) formed therein. The cooling oil is scavenged from the interior compartment and recirculated via recirculator 77 by conventional means.

In operation, the power take-off shaft 24 is rotated by the engine 12. That rotational movement is communicated via hub 40 to the disc 44, causing them to rotate as well. With the piston 66 under pressure such that it is brought against the assembly of disc 44 and plates 65, that rotational movement of the disc 44 is communicated to the plates 65, which in turn cause the housing assembly 54 to rotate, along with the hub 40. This rotational motion in turns causes the power output shaft 46 to rotate, which rotation is carried by shaft 18 to the cutting wheel, causing it to rotate. In the event, however, that the cutting wheel encounters some obstruction which prevents it from rotating, the torque to which the system is subjected increases substantially to the point where the coefficient of friction between the disc 44 and the plates 64 is overcome, causing them to slip relative to one another.

The discs and plates have a coefficient of friction which is lower in the dynamic state than in the static state. Accordingly, once the discs 44 and plates 65 begin to slip relative to one another, the friction between them is immediately reduced, thereby immediately relieving the load to which the system is subjected.

Thus, the preferred embodiment of the invention has been illustrated and described with reference to the accompanying drawings. Those of skill in the art will understand that these preferred embodiments are by way of example only. Various changes and modifications may be made without departing from the spirit and scope of the invention, which is of the full breadth and scope of the appended claims.

What is claimed:

1. In a vehicular ditching apparatus having a main frame, and an engine attached to the main frame, a transmission attached to the engine, a torsional limiting device attached to the transmission, and a rotatable cutting wheel attached to the main frame and connected to the torsional limiting device by shaft means, the improvement comprising said torsional limiting device comprising an oil cooled, adjustable mechanism having:
   a. a housing which is attached to said transmission;
   b. a first hub rotatably journalled in said housing and attached to an output shaft from said transmission;
   c. a plurality of circular discs which are keyed to said first hub, such that they rotate and are movable coaxially with said first hub;
   d. a second hub rotatably journalled in said housing, having a first end which extends exteriorly of said housing and is there connected to said shaft means and having a second end to which are keyed a plurality of plates such that they rotate and are movable coaxially with said second hub and said first hub, each said plate being sandwiched between two said discs; said second hub further having a piston chamber and a fluid driven piston housed therein which acts upon said discs and said plates to increase the friction therebetween;
   e. means for introducing, and controlling fluid pressure, in said piston chamber;
   f. means for circulating oil around said discs and said plates, said oil being used to cool said discs and said plates.

2. The invention of claim 1 wherein said plates and said discs have grooves formed in the lateral faces thereof to facilitate the flow of fluid.

3. The invention of claim 2 wherein said discs and said plates have a coefficient of friction which is less in the dynamic state than in the static state.

4. The apparatus of claim 1 further comprising an operator's compartment having a controller for controlling said means for introducing and controlling fluid pressure in said piston chamber.

* * * * *